G. H. ISLEY.
REVERSING APPARATUS FOR HEATING FURNACES.
APPLICATION FILED DEC. 14, 1917.

1,408,946.

Patented Mar. 7, 1922.

G. H. ISLEY.
REVERSING APPARATUS FOR HEATING FURNACES.
APPLICATION FILED DEC. 14, 1917.

1,408,946.

Patented Mar. 7, 1922.
SHEETS—SHEET 4.

UNITED STATES PATENT OFFICE.

GEORGE H. ISLEY, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

REVERSING APPARATUS FOR HEATING FURNACES.

1,408,946. Specification of Letters Patent. Patented Mar. 7, 1922.

Application filed December 14, 1917. Serial No. 207,090.

*To all whom it may concern:*

Be it known that I, GEORGE H. ISLEY, a citizen of the United States, residing at Worcester, in the county of Worcester and Commonwealth of Massachusetts, have invented certain new and useful Improvements in Reversing Apparatus for Heating Furnaces, of which the following, together with the accompanying drawings, is a specification.

The present invention relates to improvements in the apparatus which is used with the regenerative type of furnace, for reversing the course through such a furnace of the burning gaseous fuel.

The invention resides in the provision of such an apparatus of the simplest construction and operating on broadly new principles, whereby the reversing function is readily accomplished, and at the same time the structural disadvantages of the so-called rotary valve type, and the complications of the swinging duct type, (both forms of reversing mechanism now in ordinary use) are wholly eliminated.

The invention is fully set forth in the following detailed description, reference being had in this connection to the accompanying drawings, in which—

Like reference characters refer to like parts in the different figures.

Figures 6, 11:
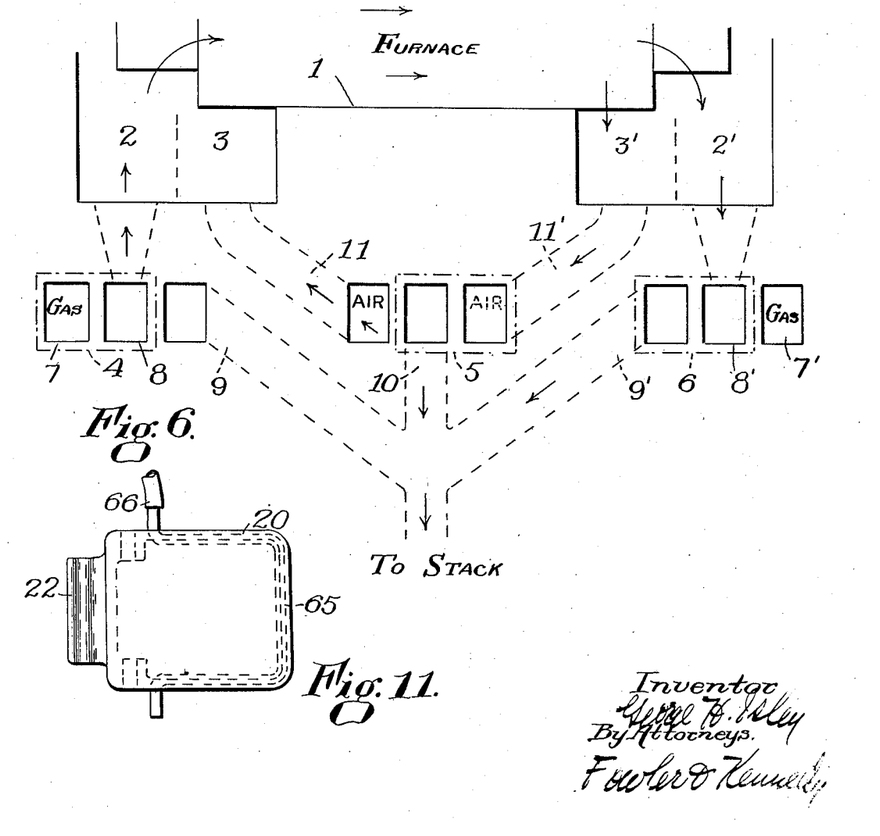
Fig. 6 is a diagrammatic view illustrating the application of my invention to a regenerative furnace of well known construction.
Fig. 11 is a top plan view of one of the flue covers used in my invention.

As herein shown, by way of example, each of the reversing instrumentalities of my invention is designed for employment with a set of three furnace flues, to connect, selectively, the intermediate flue of the set with either of the other flues. As shown in the diagram of Fig. 6, the heating furnace 1, of any well known type, is provided at its opposite ends with gas regenerator passages 2, 2' and adjacent air regenerator passages 3, 3', arranged in the manner common to devices of this class. For such a furnace three reversing instrumentalities are commonly employed, as shown at 4, 5 and 6, Fig. 6, each being operative with respect to the terminals of a set of three flues. That is to say, the reversing instrumentalities indicated at 4 and 6 respectively, Fig. 6, are operative with respect to gas flues 7, 7', regenerator flues 8, 8' and stack flues 9, 9', while the reversing instrumentality indicated at 5, Fig. 6, is operative with respect to a central stack flue 10 connecting with the stack flues 9, 9', and with air regenerator flues 11, 11', connecting with the opposite regenerator passages 3, 3'.

With the reversing instrumentalities of such a furnace in the dotted line positions indicated at 4, 5 and 6, Fig. 6, the passage of air and gas through the furnace is in the directions indicated by the arrows, from left to right, and thence from the right hand end to the stack. Under these conditions the stack flue 9 and the gas flue 7' are inoperative, while the air passes into the flue 11 as shown, which is ordinarily left partly or wholly uncovered. To effect the reversal of the gas and air from the furnace, the reversing instrumentalities 4, 5 and 6 are moved into their other positions, whereby the gas flue 7 and the stack flue 9' become inoperative, while the air enters the flue 11', as will be well understood by those conversant with the operation of reversing valves for heating furnaces. The present invention is concerned with the provision of a suitable apparatus to accomplish readily and quickly the reversal described above, and so designed as to prevent the escape of gas from the flues in the operation of reversing.

Figure 1:
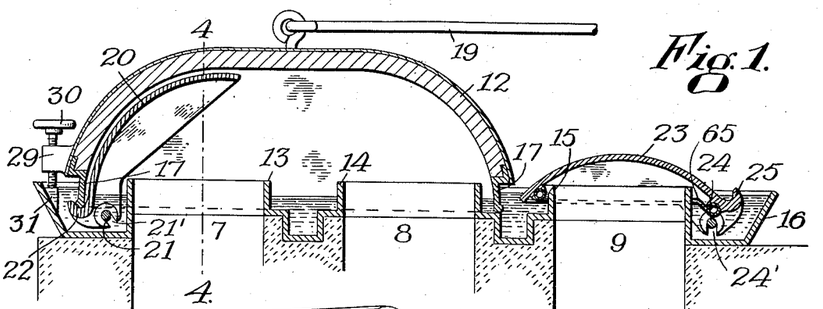
Fig. 1 is a longitudinal sectional view of one form of my improved reversing apparatus.

As shown in Fig. 1, such an apparatus may comprise a hood 12, which for convenience is shown in operative relation to the gas flue 7, regenerator flue 8 and stack flue 9 at the left hand end of the furnace 1, or as designated generally by numeral 4, Fig. 6. The terminals of flues 7, 8 and 9 are arranged in a row, so as to register with suitable openings 13, 14 and 15 of a water seal casting or pan 16, whose outer wall surrounds all of said openings. Said water seal casting or pan is suitably mounted on the brick-work in which the several flues 7, 8 and 9 are formed, and is maintained full of water in order to make a seal with a depending apron 17 which surrounds the lower edge of the hood 12.

The hood 12 is of sufficient extent longitudinally and transversely to cover and inclose two flue terminals; that is, either the terminals of flues 7 and 8, as shown in Fig. 1, or the terminals of flues 8 and 9, in the other position of said hood, not shown. The hood 12 is carried by the links or arms 18, 18, pivoted thereto and to the outer wall of the water seal casting or pan 16, and enabling said hood to be swung from the position shown in Figs. 1 and 2, upwardly and then downwardly into its other position to cover the terminals of flues 8 and 9, and vice versa, back to the position shown. Any suitable means, such as an operating rod 19, connected to any suitable source of power, not shown, may be employed for moving the hood in the manner above described, it being clear that in each of its operative positions said hood, by its depending apron 17, forms a seal with the water in the pan 16, and thereby makes a tight connection for the flow of gas from the flue 7 to flue 8, or from flue 8 to flue 9, as the case may be.

In the position shown in Fig. 1 the hood 12 serves to hold open a swinging closure 20, which is pivoted on a rod 21 extending transversely of the water seal pan 16, said closure having a projecting lip 22 which is engaged by the depending apron 17 of the hood. The movement of said hood to its other position, as above described, allows the closure 20 to descend by gravity, so as to cover the opening 13 which forms the terminal of flue 7. The disposition of the lip 22 with reference to the apron 17 is such that the closure 20 moves its full distance downwardly and seals the opening 13 before the apron 17 is fully lifted out of the water in the pan 16. In this way the escape of any gas from the flue 7 during the operation of reversing is effectually prevented, since the closure 20 descends fully and makes a water seal around the opening 13 before the water seal made by the apron 17 of the hood 12 is broken.

A similar closure 23, pivoted on a rod 24 and having a projecting lip 25 is provided for the terminal opening 15 of stack flue 9, and in the position shown in Fig. 1 said closure 23 provides a water seal around said opening 15, whereby the escape of gases from the stack is cut off. The movement of hood 12 in the act of reversing to connect the flues 8 and 9, is accompanied first by the contact of apron 17 with the water in pan 16, thereby sealing the space inclosed above the openings of said flues, and thereafter by the engagement of said apron 17 with the lip 25, which, as the hood descends, causes the closure 23 to be rocked into open position, and establishes communication between the flues 8 and 9. As herein shown, the pivotal connections of the closures 20 and 23 with their respective rods 21 and 24 are formed by means of slots 21' and 24', so that said closures may be readily removed for purposes of replacement or repair.

It will be seen that an interdependence exists in the operations of the hood 12 and the closures 20 and 23, by virtue of which the force required to lift the hood, in the beginning of the reversing movement, is supplemented by the gravitational force tending to close whichever cover 20 or 23 is open at the time, as shown in Fig. 1 the cover 20. In the same way, toward the close of the movement of reversal of the hood 12, the action of gravity in the downward movement of said hood is exerted to open whichever cover 20 or 23 is closed at that time, as shown in Fig. 1 the cover 23. In other words, the hood 12 and covers 20 and 23 are so disposed, and their operation is so related that the forces required for their operation are to a large extent balanced, thus requiring the expenditure of a minimum amount of power to lift and swing the hood 12. On account of the greater weight of the hood 12, however, it is preferred to counterbalance the same, as for instance in the manner shown in Fig. 2, by a weight 26 suitably secured to a chain or cable 27 attached to the hood and passing over guides 28, 28, whereby the force required to lift the hood is still further reduced.

As shown in Fig. 1, the hood 12 provides at one end a boss 29 in which is threaded an adjustable screw 30, the lower end of which abuts and bears against a lug 31 on the interior of pan 16 to limit the downward movement of the left hand end of hood 12, when the latter is covering and connecting the terminals of flues 7 and 8. By the adjustment of screw 30, the extent to which the apron 17 is allowed to descend into the water of pan 16 may be varied at will, and thus the degree of opening of the cover 20, with the hood 12 in this position, may be similarly varied. As shown in Fig. 1, the adjustment of the screw is such that the cover 20 is entirely opened, the left hand end of the hood being in the lowest position. However, when the screw 30 is lowered from this position, so as to make contact earlier with the lug 31, the cover 20 will be only partly raised when the hood has reached its final position over the flues 7 and 8. The construction above described forms a convenient means for controlling at will the flow of gas to the furnace, by apparatus which is self-contained in the reversing mechanism per se.

Figure 2:
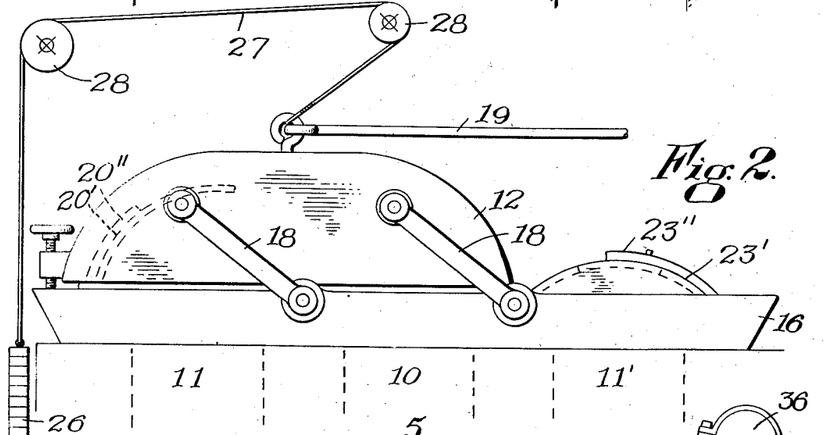
Fig. 2 is a side elevation, showing the adaptation of my reversing apparatus to a different set of furnace flues from those in Fig. 1.

In Fig. 2 the identical reversing instrumentalities of Fig. 1 are shown as applied to the air and stack flues of the furnace, corresponding to the location designated generally by the numeral 5, Fig. 6. The terminal of central stack flue 10 is shown as connected by hood 12 to the terminal of air regenerator flue 11; that is, the mechanism is reversed from the position shown in Fig. 6. The pivoted covers 20' and 23', corresponding to the covers 20 and 23 of Fig. 1, are in the same relative positions; said covers 20' and 23' are provided with openings controlled by sliding dampers 20'' and 23'', to regulate the amount of air passing therethrough to the furnace. In the position of the mechanism shown in Fig. 2, the damper 23'' is partly opened, to allow air to be drawn into flue 11' and thence through passage 3', Fig. 6, into the furnace 1, through which it passes in the reverse direction to the arrows shown in Fig. 6, in the manner well known in furnaces of this class.

Figure 3:
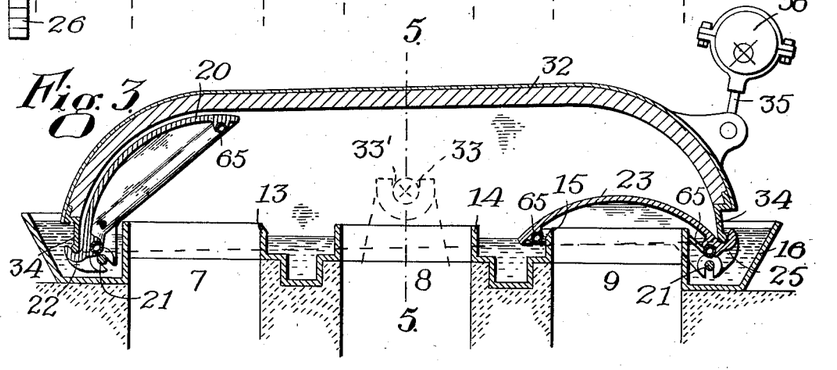
Fig. 3 is a longitudinal sectional view of a modified form of the invention.
Figure 4:
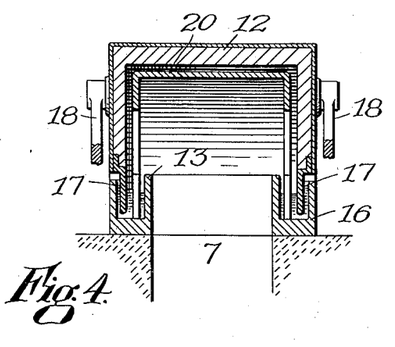
Fig. 4 is a cross sectional view approximately on the line 4—4 of Fig. 1.
Figure 5:
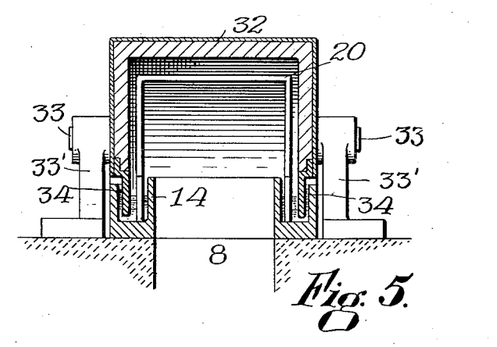
Fig. 5 is a cross sectional view on the line 5—5, Fig. 3.

A modification of my invention is shown in Figs. 3 and 5, and for convenience of description is referred to in connection with the three adjacent flue terminals 7, 8 and 9, arranged the same as in Fig. 1. In this construction the water seal pan 16 with its associated parts, and the pivoted covers 20 and 23 for the flues 7 and 9 may be of the same form as shown in Fig. 1, and are similarly designated. The reversing hood proper, however, embodies a different form, and is here shown as an elongated hood 32 extending over and covering all three openings 13, 14 and 15 of all three flue terminals 7, 8 and 9. Said hood 32, at or near its longitudinal center, is pivoted, as by means of trunnions 33, having suitable bearing recesses or slots, formed in members 33' to allow the removal of said hood. The depending apron 34 at each end of hood 32 is at all times in engagement with the projecting lips 22 and 25 of the covers 20 and 23 respectively. As a consequence, when the hood is oscillated slightly about its pivotal center to the left, as shown in Fig. 3, the descent of its left hand end effects the opening of cover 20, while the cover 23 is allowed to close, and seal the opening 15 at the terminal of flue 9. In this way communication is established between the flues 7 and 8. The reverse oscillation of the hood 32 through a few degrees effects simultaneously the closure of cover 20, to seal the opening 13 of flue terminal 7, and the opening of cover 23, thereby establishing communication between the flues 8 and 9. The hood 32 may be oscillated in any well known manner, as by a connecting rod 35, driven from an eccentric or crank 36 of small throw. The force required for such operation is very slight, since the gravitational tendencies of the hood 32 and closures 20 and 23 are such as to substantially counterbalance each other, the same as in the construction of Fig. 1.

Figure 7:
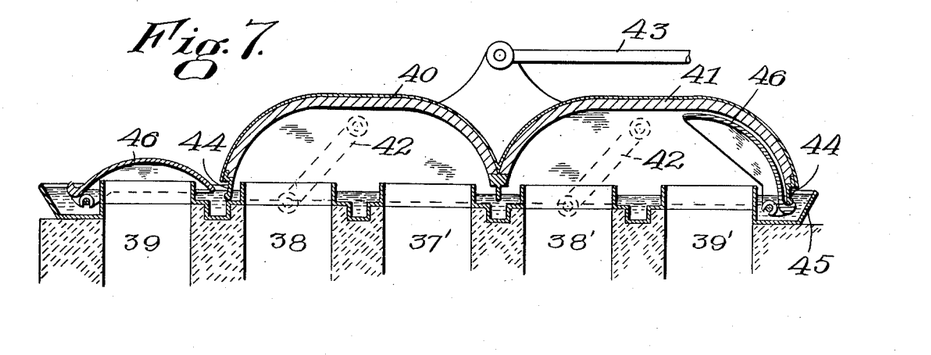
Fig. 7 is a longitudinal sectional view of a modified form of my invention.
Figure 8:
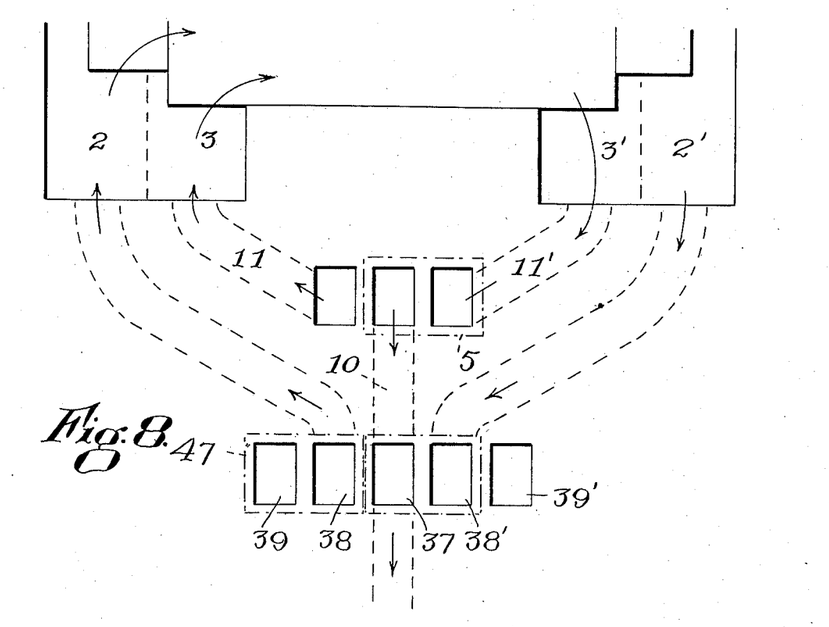
Fig. 8 is a diagrammatic view illustrating the application of the form shown in Fig. 7 to a regenerative furnace.

The modified construction shown in section in Fig. 7 is applicable to the particular arrangement of furnace flues illustrated diagrammatically in Fig. 8, where, as in Fig. 6, the furnace is indicated at 1 and the gas and air regenerator passages respectively at 2, 2' and 3, 3'. Instead of the three sets of reversing devices provided in Fig. 6, however, this construction contemplates only two, one of which for the air regenerator flues 11, 11' and the stack flue 10 is precisely the same as shown in Fig. 6, and is indicated generally by the numeral 5, as in Fig. 6.

The other reversing device shown in Fig. 8 performs the functions of the two devices 4 and 6 of Fig. 6, and to this end is shown in connection with a row of five flue terminals, consisting of a central stack flue terminal 37, connecting with main stack flue 10, adjacent regenerator flues 38 and 38' on opposite sides of flue 37 and gas flue terminals 39, 39' at opposite ends of said row. The flue terminals 38 and 38' connect with the gas passages 2 and 2' respectively, as shown by the dotted lines, Fig. 8, and the flue terminals 39 and 39' connect with gas producers or other means of gas supply, not shown, as is usual in devices of this class.

As shown in Fig. 7, the reversing apparatus for this row of five flues consists of a pair of connected hoods 40 and 41, which are adapted to move in unison as a single element, the combined hood structure thus constituted being carried by pivoted links or arms 42 corresponding to the links 18 of Fig. 2, and operated in the same manner as the single hood 12 of Figs. 1 and 2 by a rod 43 or the like. Each hood 40, 41 has a depending skirt or apron 44, 44 adapted to make a water seal with the water contained in a casting or pan 45, the latter having five openings registering with the flue terminals 37, 38, 38', 39 and 39', as shown in Fig. 7.

Each hood 40, 41 is of sufficient size to cover and inclose two flue terminals; that is, the hood 40 is adapted to connect the regenerator flue 38 with either the gas flue 39 or the stack flue 37, and the hood 41 is adapted to connect the regenerator flue 38' with either the gas flue 39' or the stack flue 37. Each gas flue 39, 39' has a detachable pivoted cover 46, which is the same in construction as the cover 20 for the single gas flue 7 of Figs. 1 and 3, and which is adapted to be operated by the contact therewith of the skirt or apron 44 of the adjacent hood 40 or 41. as the case may be.

The operation of this form of my invention will be clear from Fig. 8, where the reversing device, indicated generally by the numeral 47, is shown in its left hand position, that is, with the hoods 40 and 41 moved over from the positions shown in Fig. 7, so that the hood 40 raises the cover 46 of gas flue terminal 39 and thereby connects said flue with regenerator flue 38, while the hood 41 connects stack flue 37 with regenerator flue 38', leaving the gas flue 39' inoperative, and covered by the cover 46. In this position of the parts, the passage of air and gas through the furnace is in the direction indicated by the arrows in Fig. 8, from left to right and thence from the right hand end to the stack. When the reversing structure 47 is moved into its other position, as indicated in Fig. 7, and the reversing structure 5 is moved to the left, so as to connect flue 11 with stack flue 10, then the passage of air and gas through the furnace is completely reversed. The construction shown in Fig. 7 is of particular advantage in that the covers 46 are never exposed to the heat of gases leaving the furnace. Consequently, such covers are in no danger of warping or distortion. The cover 23 of Fig. 1 and the covers 20 and 23 of Fig. 3, however, are subject at times to the most intense heat and consequently these covers may be water cooled by a pipe 65 cast with or secured to the under side, Fig. 11, and running around the lower edge. Such a pipe 65 may be fed from a flexible supply tube 66 and may discharge into the water of pan 16. In addition to its water cooling function, such a pipe appreciably stiffens the cover and prevents its collapse under the intense heat which at times prevails under the hood.

Figure 9:
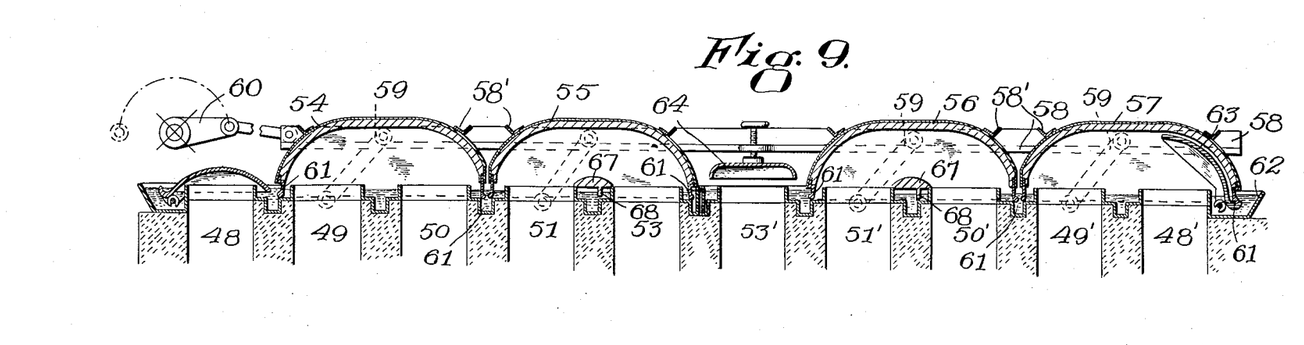
Fig. 9 is a longitudinal sectional view of another modified form of my invention.
Figure 10:
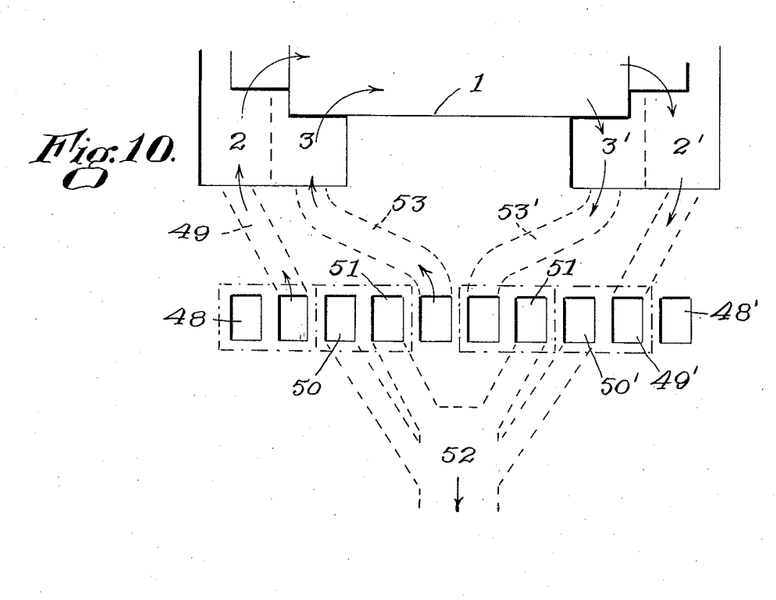
Fig. 10 is a diagrammatic view illustrating the application of the form shown in Fig. 9 to a regenerative furnace.

The modified construction shown in section in Fig. 9 is applicable to the particular arrangement of furnace flues illustrated diagrammatically in Fig. 10, where, as in Figs. 6 and 8, the furnace is indicated at 1, and the gas and air regenerator passages respectively at 2, 2' and 3, 3'. Instead of the plurality of sets of reversing devices shown in Figs. 6 and 8, however, this modification contemplates only one such device, operating as a singe unit, and adapted to effect of itself the complete reversal of the gases through the furnace.

Such a device is shown in Figs. 9 and 10 in connection with a row of ten flue terminals, consisting of a pair of gas flues 48, 48' at the ends of the row, and a pair of regenerator flues 49, 49' adjacent the terminals of said gas flues. The latter connect, as shown in Fig. 10, with the respective gas passages 2, 2' of the furnace. Inwardly of the regenerator terminals 49, 49' are disposed two pairs of stack flue terminals 50, 50' and 51, 51', the latter all communicating with a main stack flue 52. A pair of regenerator flue terminals 53, 53', connecting with the air regenerator passages 3, 3' respectively of the furnace, completes the row of ten flues.

As shown in Fig. 9, the reversing apparatus for this row of ten flues consists of a pair of adjacent hoods 54 and 55, and a similar pair of adjacent hoods 56 and 57, the two pairs of hoods being separated by a space corresponding in width approximately to one of the flue terminals. The four hoods 54, 55, 56 and 57 are adapted to move in unison as a single element, and to this end said hoods are preferably carried by a framework made up of longitudinal girders 58, 58 or the like. Each hood has transverse bars 58', 58', fitting in suitable notches of the girders, so that the hoods can be removed, individually, and repaired. The combined hood structure thus constituted is carried by pivoted links or arms 59, 59, corresponding to the links 18 of Fig. 2, and attached to the girders 58, the whole structure being moved in the same manner as the single hood of Figs. 1 and 2, by any suitable means, such as a crank 60. Each hood 54, 55, 56 and 57 has a depending skirt or apron 61 which is adapted to make a water seal with the water contained in a two-part casting or pan 62, the same providing ten openings registering with the flue terminals 48, 48', 49, 49', 50, 50', 51, 51' and 53, 53', as shown in Fig. 9.

Each hood, as in the form of Fig. 7, is adapted to cover and inclose two flue terminals. The gas flue terminals 48, 48' are equipped with detachable pivoted covers 63, 63 which are the same in construction as the cover 20 of Fig. 1, and which are adapted to be operated in precisely the same way by the contact therewith of the skirt or apron 61 of the adjacent hood 54 or 57, as the case may be. The movable hood structure constituted by the four hoods 54, 55, 56 and 57 is preferably equipped with an adjustable air controlling member 64, located and carried between the two separated pairs of hoods, and adapted for cooperation either with the regenerator flue 53 or with the regenerator flue 53', depending on the position of the hood structure.

In the position of the reversing apparatus shown in Fig. 9, gas enters through the flue 48' and passes by hood 57 to flue 49' and thence to the passage 2' of the furnace. The air for combustion is drawn past the controlling member 64 into the flue 53', and thence to the passage 3' of the furnace. The products of combustion leaving the furnace pass from passage 2 into flue 49, and thence under hood 54 into stack flue 50. Said products of combustion also pass from passage 3 into flue 53 and thence under hood 55 to stack flue 51. In this position of the parts the gas flue 48 is closed by cover 63, and the hood 56 is inoperative.

When the four hoods as a unit are moved into the position indicated in dotted lines in Fig. 10, the passage of gases through the furnace is reversed. That is, the gas from flue 48 passes under hood 54 into flue 49 and thence to passage 2 of the furnace. Air reaches the flue 53 after passing the controlling member 64 and is conveyed to the passage 3 of the furnace. The products of combustion from passage 2' leave by way of flue 49', hood 57 and stack flue 50'. The products of combustion from passage 3' leave by way of flue 53', hood 56 and stack flue 51'. The gas flue 48' is closed by cover 63 and the hood 55 is inoperative.

If desired, in order to prevent undue cooling of the escaping combustion products by the water in the pans 62, transverse bridges or walls 67 may be provided, as shown in connection with the hoods 55 and 56, Fig. 2, the same having depending water seal projections 68. In all of the forms illustrated, the hoods may, if desired, have walls partially or entirely water cooled, or may be constructed of fire-brick.

I claim,

1. In apparatus of the class described, the combination with a set of furnace flues, of a cover for the end of one of said flues, a movable reversing member adapted in one position to connect said flue with another flue, and means for operating said cover within said member.

2. In apparatus of the class described, the combination with a set of furnace flues, of a member movable selectively into different positions to establish communication between different pairs of flues, and an end closure for one of said flues adapted to be opened within said member by the movement of said member to connect said flue with another flue.

3. In apparatus of the class described, the combination with a set of furnace flues, of a closure for one of said flues, a movable reversing member adapted in one position to connect said flue with another flue, and means responsive to the movement of said member when in operative relation to said flue for operating said closure.

4. In apparatus of the class described, the combination with a set of furnace flues, of a member movable selectively into different positions to establish communication between different pairs of flues, and a cover for the end of one of said flues, held open within said member in one position of the latter, and adapted to close by the movement of said member to another position.

5. In apparatus of the class described, the combination with a set of furnace flues, of a member movable selectively into different positions to establish communication between different pairs of flues, and a cover for the end of one of said flues, held open within said member in one position of the latter, and adapted to close upon the commencement of said member's movement to another position.

6. In apparatus of the class described, the combination with a set of furnace flues, of a member movable selectively into different positions to establish communication between different pairs of flues, and an end closure for one of said flues adapted to be opened within said member by the final portion of the movement of said member to connect said flue with another flue.

7. In apparatus of the class described, the combination with a set of furnace flues, of a cover for the end of one of said flues, and a member movable selectively into different positions to establish communication between different flues, the movement of said member into operative relation to said cover equipped flue procuring the opening of said cover within said member.

8. In apparatus of the class described, the combination with a set of furnace flues, of a cover for the end of one of said flues, a movable reversing member adapted in one position to connect said flue with another flue, and means responsive to the movement of said member for opening said cover within said member.

9. In apparatus of the class described, the combination with a set of furnace flues, of a closure for one of said flues, and means movable into a position to establish a water-sealed communication between said flue and another flue, and adapted by its movement to open said closure after said water seal is made.

10. In apparatus of the class described, the combination with a set of furnace flues, of a shut-off device for one of said flues, and a movable member adapted in one position to hold said device open and to provide a water seal around said flue, and adapted when moved to permit closure of said shut-off device before breaking said water seal.

11. In apparatus of the class described, the combination with a set of furnace flues, of a gravity closing shut-off for one of said flues, and a movable member adapted in one position to hold said shut-off open and to provide a water seal around said flue, and adapted by its movement to release said shut-off before said water seal is broken.

12. In apparatus of the class described, the combination with a set of furnace flues, of a closure adapted in one position to water seal one of said flues, and means movable into a position to establish a water-sealed communication between said flue and another flue and adapted by its movement, after establishing said water seal communication, to open said closure.

13. In apparatus of the class described, the combination with a set of furnace flues, of a closure adapted in one position to water seal one of said flues, and means movable into a position to establish a water-sealed communication between said flue and another flue and adapted by its movement to open said closure after said water-sealed communication has been made.

14. In apparatus of the class described, the combination with a set of furnace flues, of a closure adapted in one position to water seal one of said flues, and means movable into a position to establish a water-sealed communication between said flue and another flue and adapted by its movement to break the water seal of said closure after said water-sealed communication has been established.

15. In apparatus of the class described, the combination with a set of furnace flues, of a closure adapted in one position to water seal one of said flues, and a movable member adapted in one position to hold said closure open and to provide a water seal around said flue, and adapted by its movement to release said cover and cause the water sealing of said flue thereby, before its own water seal is broken.

16. In apparatus of the class described, the combination with a set of furnace flues, of a closure adapted in one position to water seal one of said flues, and a movable member adapted in one position to hold said closure open and to provide a water seal around said flue, and adapted by its movement to cause the water sealing of said flue by said closure before the water seal provided by said member is broken.

17. In apparatus of the class described, the combination with a set of furnace flues, of a member movable selectively into different positions to establish communication between different pairs of flues, a closure for one of said flues adapted to be opened by the movement of said member to connect said flue with another flue, and adjustable means for limiting said movement of said member, to vary the degree of opening of said closure.

18. In apparatus of the class described, the combination with a set of furnace flues, of a member movable selectively into different positions to establish communication between different pairs of flues, an end closure for one of said flues adapted to be opened within said member by the final portion of the movement of said member to connect said flue with another flue, and means for adjusting the degree of opening of said end closure.

19. In apparatus of the class described, the combination with a set of furnace flues, of a closure for one of said flues, means movable into a position to establish a water-sealed communication between said flue and another flue, and adapted by its movement to open said closure, and adjustable means cooperating with said movable means for varying the degree of opening of said closure.

20. In apparatus of the class described, the combination with a set of furnace flues, of a closure adapted in one position to water seal one of said flues, means movable into a position to establish a water-sealed communication between said flue and another flue and adapted by its movement to open said closure after said water-sealed communication has been made, and adjustable means cooperating with said movable means for varying the degree of opening of said closure.

21. In apparatus of the class described, the combination with a movable reversing member for a set of furnace flues, of a cover for one of said flues, held open within said member in one position thereof, and adapted to close by gravity when said reversing member is moved.

22. In apparatus of the class described, the combination with a movable reversing member for a set of furnace flues, of a gravity acting closure for one of said flues, said closure when in open position exerting its closing force to assist in initiating the movement of said reversing member.

23. In reversing apparatus for regenerative furnaces, the combination with a set of furnace flues of a flue connecting element, and a gravity closing shut-off for one of said flues, held open by said element in one position of the latter, and exerting its closing force to procure the elevation of said flue connecting element in the movement of said element to another position.

24. In apparatus of the class described, the combination with movable reversing means for a set of furnace flues, of a pivoted cover for one of said flues, held open within said reversing means in one position thereof, and adapted to close by gravity upon the commencement of the reversing movement of said reversing means.

25. In apparatus of the class described, the combination with a reversing means for a set of furnace flues, of a gravity closing shut-off for one of said flues, held open by said reversing means in one position thereof and exerting its closing force to partly counterbalance the weight of said reversing means.

26. In apparatus of the class described, the combination with a reversing means for a set of furnace flues, adapted to be raised in the act of establishing communication between different pairs of flues of said set, of a gravity closing shut-off for one of said flues, held open by said reversing means in one position thereof, and adapted to exert its closing force to assist in raising said reversing means, when the latter is moved.

27. In apparatus of the class described, the combination with reversing means for a set of furnace flues, of a pivoted cover for one of said flues adapted to be opened and closed within said reversing means, said cover being slotted for connection to its pivotal axis, whereby detachment of said cover from said pivotal axis is permitted.

28. In apparatus of the class described, the combination with reversing means for a set of furnace flues, of a pivoted cover for one of said flues adapted to be opened and closed by the movement of said reversing means, said cover having a slot for connection to its pivotal axis extending vertically in the closed position of said cover, whereby said cover may be raised bodily, in removing the same from said flue.

29. In reversing apparatus for regenerative furnaces, the combination with flue connecting elements, of gravity closing covers for certain flues, each cover adapted to be opened within its associated flue connecting element when the latter is made operative with respect to the flue that is equipped with said cover.

30. In reversing apparatus for regenerative furnaces, the combination with flue connecting elements, of gravity closing covers for certain flues, each cover having a projection in the path of its associated flue connecting element, for engagement by said element to open said cover when said element has been made operative with respect to the flue that is equipped with said cover.

31. In apparatus of the class described, the combination with movable reversing means for a set of furnace flues, having a water seal apron, of a pivoted cover for one of said flues having an extension adapted for engagement by said water seal apron, to open said cover, in the movement of said reversing means to connect said flue with another flue.

32. In apparatus of the class described, the combination with movable reversing means for a set of furnace flues, having a water seal apron, of a pivoted cover for one of said flues having an extension engageable by said apron, to open said cover after said apron, in the movement of said reversing means, has established a water seal around said flue.

33. In apparatus of the class described, the combination with movable reversing means for a set of furnace flues, of a gravity closing shut-off for one of said flues arranged, when open, to partially counterbalance the weight of said reversing means.

34. In apparatus of the class described, the combination with movable reversing means for a set of furnace flues, of a gravity closing shut-off for one of said flues arranged, when open, to partially counterbalance the weight of said reversing means, and means for further counterbalancing the weight of said reversing means, in the movement thereof, to establish communication between different pairs of flues.

35. The combination with gas, regenerator and stack flues of a furnace, of a movable reversing means adapted in one position to cover and connect the ends of said gas and regenerator flues, and in another position to cover and connect the ends of said regenerator and stack flues, and a closure for said gas flue adapted to be opened within said reversing means by the movement of said reversing means to cover said gas flue.

36. The combination with gas, regenerator and stack flues of a furnace, of a movable reversing means adapted in one position to cover and connect the ends of said gas and regenerator flues, and in another position to cover and connect the ends of said regenerator and stack flues, and a closure for said stack flue adapted to be opened within said reversing means by the movement of said reversing means to cover said stack flue.

37. The combination with gas, regenerator and stack flues of a furnace, of a movable reversing means adapted in one position to cover and connect the ends of said gas and regenerator flues, and in another position to cover and connect the ends of said regenerator and stack flues, and closures for said gas flue and said stack flue, adapted to be opened by contact with said reversing means when the latter is moved to cover their respective flues.

38. In reversing apparatus for regenerative furnaces, the combination with a set of flue terminals, of a movable member, adapted, in different positions, to connect different terminals, sealing means for said terminals carried by said movable member, and covers for certain of said terminals adapted to be opened by contact therewith of said sealing means.

39. The combination with a regenerative furnace having gas supply flue terminals for the opposite ends thereof, of a set of furnace reversing devices adapted to connect one or the other of said gas supply flue terminals with the furnace, and independent means operable by said devices for sealing the gas supply flue terminal which is not so connected.

40. The combination with a regenerative furnace having gas supply flue terminals for the opposite ends thereof, of a set of furnace reversing devices adapted to connect one of said gas supply flue terminals with the furnace, and to expose the other, and independent means responsive to the movement of said reversing devices for sealing said exposed terminal.

41. In apparatus of the class described, the combination with a set of gas, regenerator and stack flues for a furnace, of a plurality of connected hoods, each adapted to establish communication between a pair of adjacent flues, and each adapted for movement to connect a different pair of adjacent flues, and covers for the ends of certain of said flues, each adapted to be opened within a hood by the disposition of the latter in operative relation to its flue.

42. The combination with a set of furnace flues, of closures for certain of said flues, adapted to be opened upon the establishment of communication between said flues and other flues of the set, and combined cooling and stiffening means for those closures which are exposed to the action of hot gases from the furnace.

43. In apparatus of the class described, the combination with a set of gas regenerator and stack flues for a furnace, of a plurality of connected hoods, each adapted to establish communication between a pair of adjacent flues, and each adapted for movement to connect a different pair of adjacent flues, to reverse the course of the gases through the furnace each gas flue having a closure adapted to be opened by the disposition of a hood in operative relation thereto, whereby to connect said gas flue with the adjacent regenerator flue, and the remaining flues being without closures, whereby there is no exposure of flue closures to the action of exhaust gases from the furnace.

44. The combination with the gas supply, stack and regenerator flues of a regenerative furnace, of a reversing device movable alternately to connect said regenerator flue with either one of said other flues, and an independent closure for said gas supply flue, adapted to open automatically upon the movement of said reversing device into operative relation to said flue.

45. The combination with the gas supply, stack and regenerator flues of a regenerative furnace, of a reversing device movable alternately to connect said regenerator flue with either one of said other flues, and a self-closing shut-off device for said gas flue, adapted to be opened by the movement of said reversing device into operative position with respect to said flue.

46. The combination with a set of furnace flues, of a reversing device movable selectively into different positions to establish communication between different flues of said set, and a gravity closing shut-off for one of said flues, said shut-off being opened automatically by the movement of said reversing device into operative relation to said flue.

47. Reversing apparatus for a regenerative furnace, comprising a movable flue connecting member, and a flue closure, said closure being opened automatically by the movement of said connecting member as the latter assumes an operative relation to said closure-equipped flue.

Dated this 12th day of December, 1917.

GEORGE H. ISLEY.

Witnesses:
NELLIE WHALEN,
GEO. H. KENNEDY, Jr.